United States Patent [19]

Lau et al.

[11] Patent Number: 5,377,348

[45] Date of Patent: Dec. 27, 1994

[54] SYSTEM FOR SEARCHING A DATA BASE BY CREATING A MARKING MATRIX IN WHICH TWO DIMENSIONAL PATTERNS CONTROL THE SEARCH AND SELECTION

[75] Inventors: Yau C. Lau, Poughkeepsie, N.Y.; Eric J. Mozdy, Meadville, Pa.; John A. Oleszkiewicz, Poughkeepsie, N.Y.

[73] Assignee: International Business Machines Corporation, Armonk, N.Y.

[21] Appl. No.: 893,297

[22] Filed: Jun. 4, 1992

[51] Int. Cl.$^5$ .......................................... G06F 15/40
[52] U.S. Cl. .......................... 395/600; 364/DIG. 1; 364/282.1; 364/282.2
[58] Field of Search .................. 395/600; 364/419; 382/54

[56] References Cited

U.S. PATENT DOCUMENTS

| | | | |
|---|---|---|---|
| 5,150,430 | 9/1992 | Chu | 382/56 |
| 5,168,533 | 12/1992 | Kato et al. | 382/54 |
| 5,175,860 | 12/1992 | Yamada | 395/800 |
| 5,179,643 | 1/1993 | Homma et al. | 395/140 |
| 5,206,949 | 4/1993 | Cochran et al. | 395/600 |
| 5,224,038 | 6/1993 | Bespalko | 364/419 |

FOREIGN PATENT DOCUMENTS 9206440 4/1992 WIPO .

OTHER PUBLICATIONS

Aggarwal et al, Notes on searching in multidimensional monotone arrays, Proc. 29th Annual Symposium on Foundations of Computer Science, 24–26 Oct. 1988, pp. 497–512.

Nakamura et al, Data Structures for Multi-layer N-dimensional Data using hierarchicall structure, Proc. 10th International Conference on Pattern Recognition, 16–21 Jun. 1990, pp. 97–102

R. Ashany, "Application of Sparse Matrix Techniques to Search, Retrieval, Classification and Relationship Analysis in Large Data Base Systems-Sparcom", 4th Int'l Conf. on Very Large Data Bases, Sep. 13, 1978, Berlin, Germany, pp. 499–510.

*Primary Examiner*—Thomas C. Lee
*Assistant Examiner*—Wayne Amsbury
*Attorney, Agent, or Firm*—Lynn L. Augspurger; Richard M. Ludwin

[57] ABSTRACT

A two dimensional matrix of marks indicating match or mismatch of one or more search arguments with the value of data elements accessed from a field common with all records of a database file. The matrix of marks created after one pass through all the records of the file is searched for a specified pattern which identifies records where the data element values, as between successive records, have a certain sequence as specified by the search arguments.

7 Claims, 6 Drawing Sheets

SYSTEM FOR SEARCHING A DATA BASE BY CREATING A MARKING MATRIX IN WHICH TWO DIMENSIONAL PATTERNS CONTROL THE SEARCH AND SELECTION

FIELD OF THE INVENTION

This invention relates to a database searching system, and more particularly to a searching system that provides for identifying records in the database that have a specified sequence of data element values in a particular field of successive records.

BACKGROUND OF THE INVENTION

A typical database file consists of a series of rows and columns. Each row has a fixed length and holds the data items for a respective one record. Each column, or field, of the database file holds values for a respective one parameter of a family of parameters. One example of a database file is often described in terms of a file of employee records. Each record includes a number of fields or parameters, such as name, address, age, salary, department, etc.

A readily apparent use of this type of database would be to search or query the database to return employee records where the parameters of each record must meet certain criteria. For example, return the records of employees from departments D82 or D75, who are over 50 years old, and have a salary less than $50,000.00. Each record would be examined in those fields, the logic performed, and made available to the user if all parameters fit the specified values.

Another type of database file that might be characterized as an historical file would consist of a record for each of a series of events or time periods. The fields or parameters would hold values that existed at that time period. The record could represent a day, month, year, etc., and the parameters would hold values of various measured properties. The use described above would still be available to return records where various parameters of a particular record met specified search arguments or criteria.

The use described above involves a search or query that could be characterized as horizontal. That is a plurality of parameters in each horizontal row or record of the file is compared with search arguments. The record returned must have parameters that meet all of the search arguments.

A use of an historical database file that gave rise to the present invention involves a file created for a large number of computer circuits, busses, and registers recording values for thousands of cycles of operation of a computer. Analysis of the file created often requires knowledge of the value of parameters or fields existing during a particular sequence or series of cycles. For example, identify the records where the instruction sequence was ADD,SUBTRACT,DIVIDE and the memory address register had the values 10,20,5.

What is required in the above example is not a horizontal search, but rather a vertical search. The information desired results from a relationship of parameter values in one column of successive records, and not between parameters in one particular record. A typical search or query program for horizontal searching of a database file is not suitable.

SUMMARY OF THE INVENTION

An object of the present invention is to provide a system for searching a database file in the vertical direction.

Another object of the present invention is to provide a system for searching a database file to identify records that have a parameter value relationship as between succeeding records.

A further object of the present invention is to provide a system for searching a database file to identify records where the same parameter of successive records have a specified sequence of values.

These objects and other features and advantages are achieved in a system that creates a two dimensional matrix or array of marks. The mark matrix has a number "N" of rows equal to the number of records in the database file. The mark matrix has a number "M" of columns equal to the number of search arguments presented to the search system, each column representing an associated search argument.

A particular parameter, field, or column of the database is accessed from row 1 to row N, and the data element value is compared with each of the M search arguments. In the corresponding column of each of rows 1 through N of the mark matrix, a match or mismatch indication will be entered in the mark matrix for the M search arguments.

At the completion of a single pass through the database file, the pattern of match and mismatch indications are examined in the mark matrix. The searched for sequence of search arguments, and therefore the desired record numbers, will be identified if the search pattern through the mark matrix progresses from a match in column 1 of a row, through succeeding rows and columns of the mark matrix, to a match indication in the Mth or final column of the mark matrix.

Two or more parameters, fields, or columns of a database file can be compared against two or more sets of search arguments. A mark matrix with match and mismatch indications is created for each set of search arguments. Again, after one pass through the database, and creation of the two or more mark matrices, the matrices are logically ANDed to create a resultant mark matrix. The resultant matrix of match and mismatch indications is searched in the same fashion as before to identify records where the sequence of values in the two or more columns meet the two or more sets of search arguments.

DESCRIPTION OF THE PREFERRED EMBODIMENT

The basic distinction between a typical database search or query, and the search capability of the present invention will be described in connection with the following Table 1. A typical horizontal search in response to a query presenting search arguments will examine relationships between various fields in each record of a database file, and return the record if all fields in the record meet the search arguments. The present invention will return identity of records that meet a query, or set of search arguments, that require a specified relationship between values of data elements from the same column in successive records of the database file.

TABLE 1

| Problem: Find beginning and ending record where data field values have the sequence; | | |
|---|---|---|
| Record No. | 1,4,16 Data Field | Marking Matrix 1 2 3 |
| 1 | 1 | = . . |
| 2 | 3 | . . . |
| 3 | 1 | = . . |
| 4 | 4 | . = . |
| 5 | 16 | . . = |
| 6 | 22 | . . . |
| 7 | 4 | . = . |
| 8 | 16 | . . = |
| — | — | — |
| N | 6 | . . . |
| Answer: 3,5 | | |

The method for creating the marking matrix above will be subsequently described. The data field shown represents the column of data taken from a common field of all of the N records of a database file. The problem presented calls for comparing the values of the N data elements with three search arguments. This creates a N by 3 marking matrix.

A significant feature of the present invention is that only a single access of the N data elements in the vertical columns of the database is required. As each data element is accessed from a row of the database, it is compared with the three search arguments, and the corresponding row of the marking matrix is marked as a match (=) or mismatch (.) in the column associated with a search argument. Although the indication of = or . could be coded characters stored in the matrix, typically all the elements of the matrix would initially be set to binary "0" and changed to a binary "1" to indicate a match with a search argument.

When the marking matrix has been created with indications of the value relationship of each data element with the search arguments, the indications of match or mismatch will create a search pattern that depends on the indications found in each row of the matrix beginning at row 1 and column 1. In Table 1, a match at row 1 column 1 (1,1) will cause the search to examine row 2 column 2 (2,2). Finding a mismatch . will cause the next examination to be at 3,1. The match there will cause recording of the number 3 in a stack, and examination of 4,2 where the match will cause examination of 5,3 where a match is found. The solution of various problems presented to the method of the present invention is recognized whenever the search pattern progresses from a match at column 1 of a row in the marking matrix to a match in a subsequent row and the final column M (column 3 in the example of Table 1). This will cause the recording of the number 5 in the stack, and the solution of the problem becomes 3,5 since these records, along with record 4 meet the sequence of values presented by the search arguments in the problem.

In the example of Table 1, the search would continue at column 1 of row 6 and never progress to column 2 in view of the remaining mismatch indications. The search would end upon reaching row N of the marking matrix.

Although the present invention was conceived to solve problems like that posed in Table 1, once the marking matrix has been created after the single pass through the database, other problems can be solved. For example it would be very easy to search the matrix to determine the records, or number of records, that had a value of 1 in the field. Another problem that could be answered would be what records have a value of 4 followed by 16. A search could be formulated to examine only columns 2 and 3 and return a solution of 4,5 and 7,8.

Figure 1:
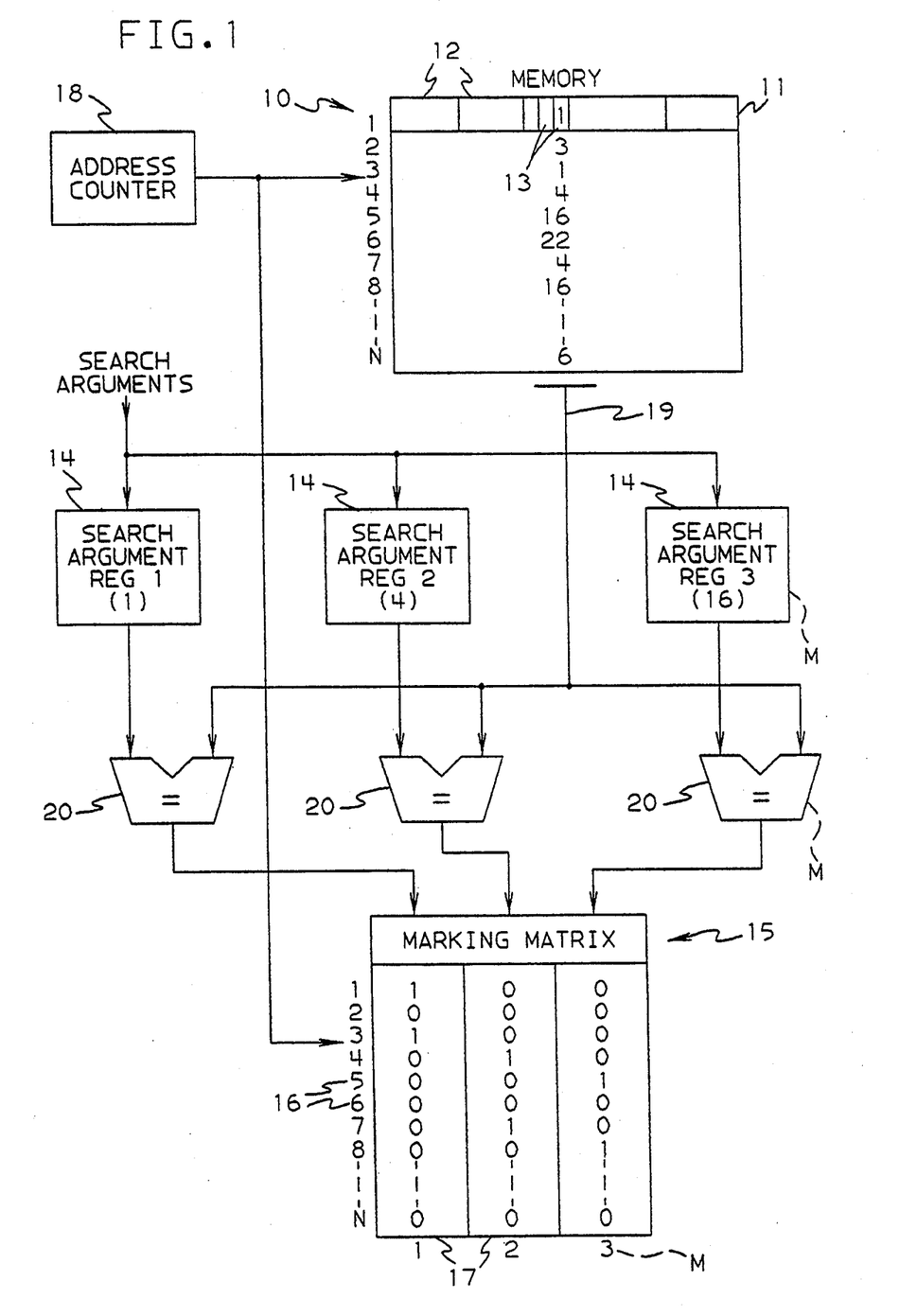
FIG. 1 is a schematic diagram showing the logic for creating an array or matrix of marks for indicating relationship between a data element and one or more search arguments.
Figure 2:
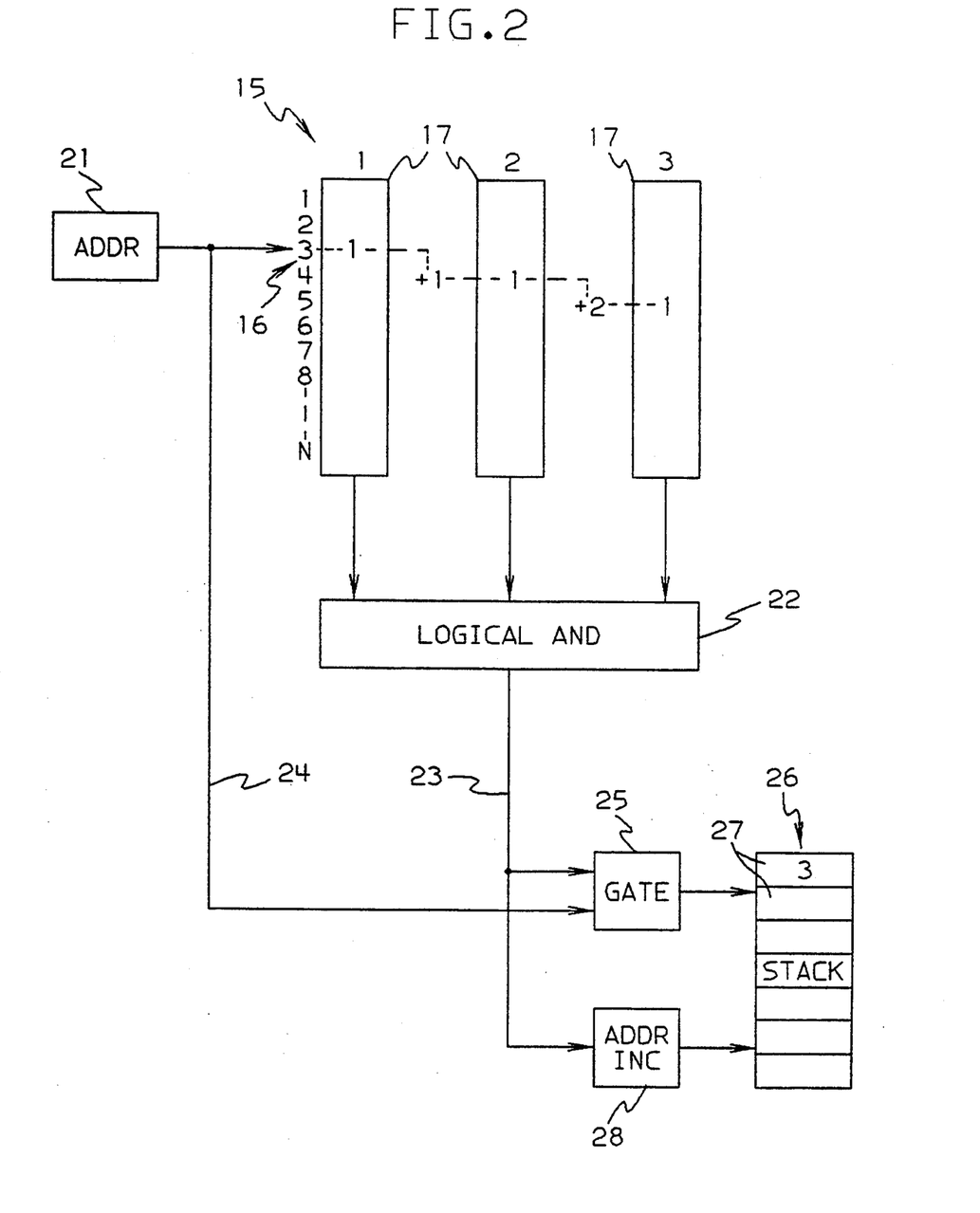
FIG. 2 is a schematic diagram showing the method of searching a mark matrix for records matching search arguments.

FIG. 1 and FIG. 2 are schematic diagrams of the logic for creating a marking matrix and search of the matrix for the problem posed in Table 1. A database file stored in a memory of a data processing system is shown generally at 10 in FIG. 1. The database 10 is comprised of records 11, or rows, numbered 1 through N. Each record 11 can be comprised of a plurality of data element fields 12, and each field 12 can be comprised of one or more binary bit columns 13. A user, after identifying and storing a database 10, would specify the field 12, or particular columns 13 that are to be accessed during the search of data element values. The specification of fields 12 or columns 13 identify parameters or data common to all records 11, and therefor create a column of data to be used in the vertical search allowed by the present invention.

The user would now specify the search arguments that are desired. These would be entered into search argument registers 14. In accordance with the problem posed in Table 1, the values 1, 4, and 16 would be entered in respective registers 14. As shown in FIG. 1, any number M of search arguments can be entered.

By specifying the number of search arguments, 3 in the case of Table 1, the user will have indicated the number of columns required for a marking array or matrix noted generally at 15 in FIG. 1. This will create a N by M two dimensional matrix having N rows 16, and M columns 17. While three are shown in FIG. 1, it is also noted there can be up to M columns 17.

An address counter 18 will access the rows 1 through N of both the data base 10 and marking array 15. The data elements of the fields 12 or columns 13 of the database 10 will be accessed in succession and presented over line 19 to comparators 20. The value of each data element accessed will be compared in comparators 20 with the value of a search argument in registers 14. As the rows 11 of the database 10 and rows 16 of the marking array 15 are accessed, the compare or not of each data element with a search argument in registers 14 will cause a binary 1 to be stored in the appropriate column 17 of the marking array 15. The pattern of binary 1's and 0's shown in FIG. 1 match the pattern of = and . in Table 1.

FIG. 2 is a schematic diagram of logic that will provide the solution found in the Table 1 example. The marking array 15 with rows 1 through N and columns 1 through 3 is shown. An address counter 21 can be designed to access successive rows one greater for each column 17 causing a read out of 3 successive rows and columns of the marking matrix 15. The binary 1 or 0 of the successive rows and columns will be presented to a logical AND gate 22. When all three inputs are binary 1 as shown in FIG. 2, an output on line 23 will be produced.

Energizing of line 23 will cause the contents of address counter 21 on line 24 to be passed through gate 25 to the first location of a stack 26 of registers 27. The output on line 23 will cause an address incrementer 28 to access the next register 27 of stack 26 to store another value if one is found as the address counter 21 steps through all rows 16 of the marking matrix 15. Since the number of search arguments is known, only the first record number (3) need be stored since it is known the ending record will be number 5. The hardware logic of FIG. 2 finds the pattern of match indications that progress on a diagonal from column 1 of the marking matrix 15 to column 3.

FIGS. 1 and 2 show logic for practicing the present invention. A preferred embodiment of the present invention utilizes programming to accomplish the various steps in creating a marking matrix 15 of FIG. 1 and to vary the search pattern when examining the match or mismatch indications recorded in the marking matrix depending on the problem presented.

Figure 3:
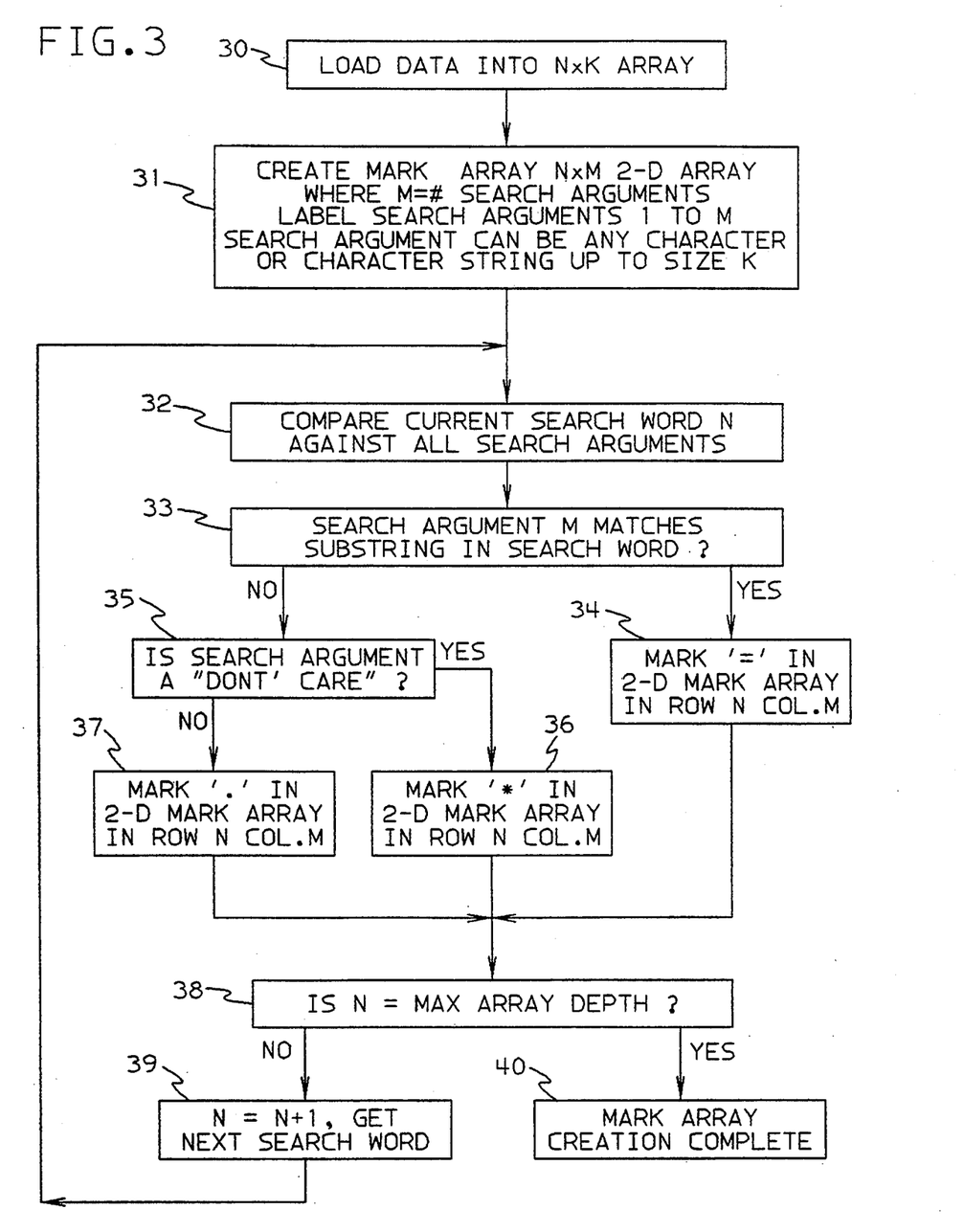
FIG. 3 is a data flow diagram showing the method of creating a mark matrix in accordance with the present invention.

FIG. 3 shows the programming steps needed for creating the indications in the marking matrix. At 30 the N data elements of a database file of N records is specified. This would include the size K of the field or number of columns of the record being accessed. At 31 the N by M two dimensional array of the marking matrix is specified.

At 32 access of each of the N data elements in a column of data elements is accessed and compared with each of the M search arguments. At 33 the match or mismatch indication is determined. At 34 a match (= or binary 1) is recorded in the appropriate column of the marking matrix associated with the search argument. If the data element does not match any search argument, another determination is made at 35. Some problems will cause some search arguments to be designated a "don't care" (*). Such an example will be described subsequently. A don't care * will record a binary 1 for a matrix position. In a don't care situation to be described, the second search argument register 14 storing a value of 4 in FIG. 1 will store a "*" and be effective to store a * or 1 in each row of column 2 of the marking matrix 15. If a search argument is *, at 36 the associated column will be marked with a * or binary 1. If a search argument is not a don't care, and the data element does not match any search argument, at 37 all columns of the marking matrix with neither a * or = will be marked with a mismatch . or binary 0.

At 38 the determination is made whether all N data elements have been accessed. If not, at 39 the next row or data element of the database is accessed, and the next row of the marking matrix is accessed for the next comparison. If N has been reached, the marking matrix creation ends at 40.

Figure 4:
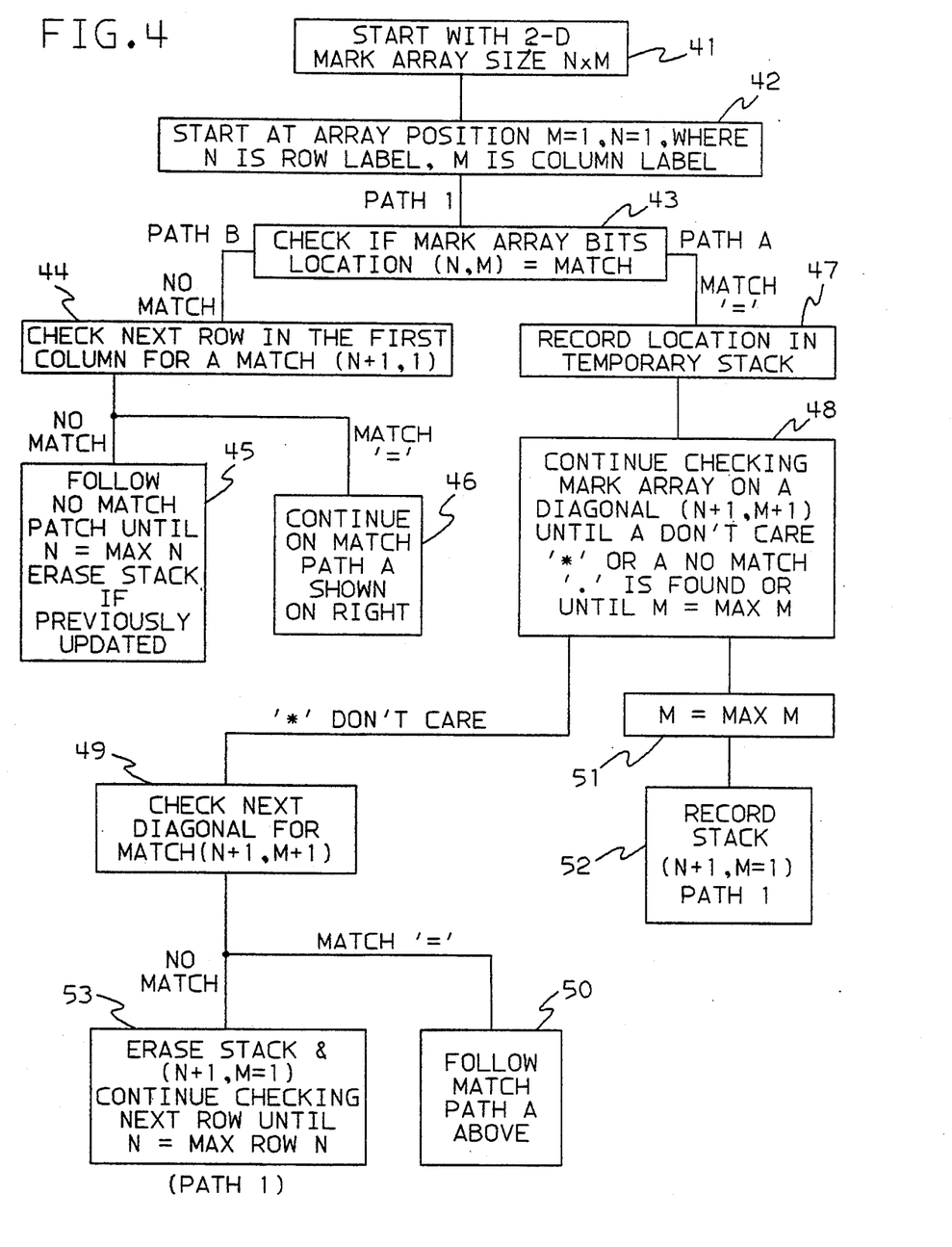
FIG. 4 is a data flow diagram showing a method of searching a mark matrix in accordance with the present invention for a particular vertical relationship between records in a database file.

Table 2 which follows, and FIG. 4 will be used to describe a marking matrix creation and search pattern traversal of the matrix using a don't care (*) search argument.

TABLE 2

Problem: Find beginning and ending record where data field values have the sequence; 3 followed by 4 with one intervening record.

| Record No. | Data Field | Marking Matrix 1 2 3 |
|---|---|---|
| 1 | 1 | . * . |
| 2 | 3 | = * . |
| 3 | 1 | . * . |
| 4 | 4 | . * = |
| 5 | 16 | . * . |
| 6 | 3 | = * . |
| 7 | 4 | . * = |
| 8 | 16 | . * . |
| 9 | 5 | . * . |
| — | — | — |
| N | 6 | . * . |

Answer: 2,4

The problem statement of Table 2 requires column 2 of the marking matrix to indicate a don't care (*) at each row. In view of the simplicity of the two dimensional marking matrix, design of program steps for searching the matrix for a desired pattern of marks is readily apparent. FIG. 4 shows the necessary steps to detect the answer above, and eliminate the recording of records 6 and 7 in the data sequence.

At 41, 42 and 43 the search of the matrix starts at row 1, column 1 of the marking matrix. In the example of Table 2, the mismatch path B is taken to 44 to continue checking successive rows at column 1 of the matrix. If there were no records that had a value of 3 in the example, step 45 would continue until the final record N is reached.

Part of path B is step 46 which would be effective in the example to detect the value 3 in record number 2. This record number would be recorded in a stack at 47 as part of path A in the program steps. A basic theory of a solution to a problem posed using the marking matrix is to progress from row to row and column to column in the matrix until a match is found in the final column (Max M). This basic theory is started at 48 in the program steps.

In accordance with the example of Table 2, testing of row 3 and column 2 will find the * don't care indication and the steps will proceed to 49 where row 4, column 3 will be tested and a match will be found. At 50 the program will return to path A where record number 4 will be recorded in the stack at 47. Step 48 will detect that Max M (3) has been reached, so steps 51 and 52 will be effective to permanently record the solution 2,4 and cause the search to continue at row 5, column 1 along path 1 to step 43.

The match at row 6, column 1 will be found at 46 and the search will return to steps 47 and 48. Record number 6 will be recorded in the stack at 47. At 48 the don't care * at row 7, column 2 will be found and the steps proceed to 49 where a test of row 8, column 3 will find a no match indication. Step 53 will erase the recorded record number 6 from the stack, and return the search to path 1 at row 9, column 1.

Although the marking matrix creation examples above have looked for equality of search arguments with data elements, value ranges can also be specified in setting up program steps for creation of the marking matrix. Table 3 which follows is an example of this.

TABLE 3

Problem: In what years did stock index increase
from 250 to 300
1st argument 250
2nd argument 250 < Index < 300
3rd argument 300

| Year | Index | Marking Matrix 1 2 3 |
|---|---|---|
| 70 | 250 | = . . |
| 71 | 260 | . = . |
| 72 | 230 | . . . |
| 73 | 300 | . . = |
| — | — | — |
| — | — | — |
| 85 | 250 | = . . |
| 86 | 270 | . = . |
| 87 | 255 | . = . |
| 88 | 300 | . . = |
| — | — | — |

Answer: 85,88

In this example the schematic diagram of the logic shown in FIG. 1 would be modified to replace the second search argument register 14 and comparator 20 with program steps or logic that would mark the marking matrix column 2 with the results of the value ranges shown in the problem. As before, program steps for searching the marking matrix would be designed to progress from row to row and column to column, starting at column 1, until a match is found at column 3 (M). In the example above, the finding of a mismatch at the year 72 would cause the search to start at column 1 in the next row.

The two dimensional marking matrix of the present invention is very well suited for searching a database file with a large number of records created during the sampling of various registers and signals for testing a data processing system. The historical data of many cycles of operation must be searched for particular sequences of values and often requires analysis of cycles involving particular sequences of several fields in the records. Table 4 demonstrates the ability of the present invention to accomplish this result.

TABLE 4

Problem: Find records where data in Field 1 has the
sequence 1,4,3 and Field 2 has the sequence
2,4,6

| Record | Field 1 | Matrix 1 1 2 3 | Field 2 | Matrix 2 1 2 3 | Result 1 2 3 |
|---|---|---|---|---|---|
| 1 | 1 | = . . | 2 | = . . | = . . |
| 2 | 4 | . = . | 4 | . = . | . = . |
| 3 | 3 | . . = | 5 | . . . | . . . |
| 4 | 1 | = . . | 2 | = . . | = . . |
| 5 | 7 | . . . | 4 | . = . | . . . |
| 6 | 1 | = . . | 2 | = . . | = . . |
| 7 | 4 | . = . | 4 | . = . | . = . |
| 8 | 3 | . . = | 6 | . . = | . . = |

Answer: 6,8

In this example, first and second sets of search arguments are compared with data elements from first and second fields of the records to create first and second two dimensional marking matrices. The first and second marking matrices are created as previously discussed. A result marking matrix is created by ANDing the results from the first and second matrices. The result matrix is then searched as previously discussed to find a pattern that progresses from column 1 of a row diagonally from row to row and column to column until column 3 of the result matrix is reached.

Figure 5:
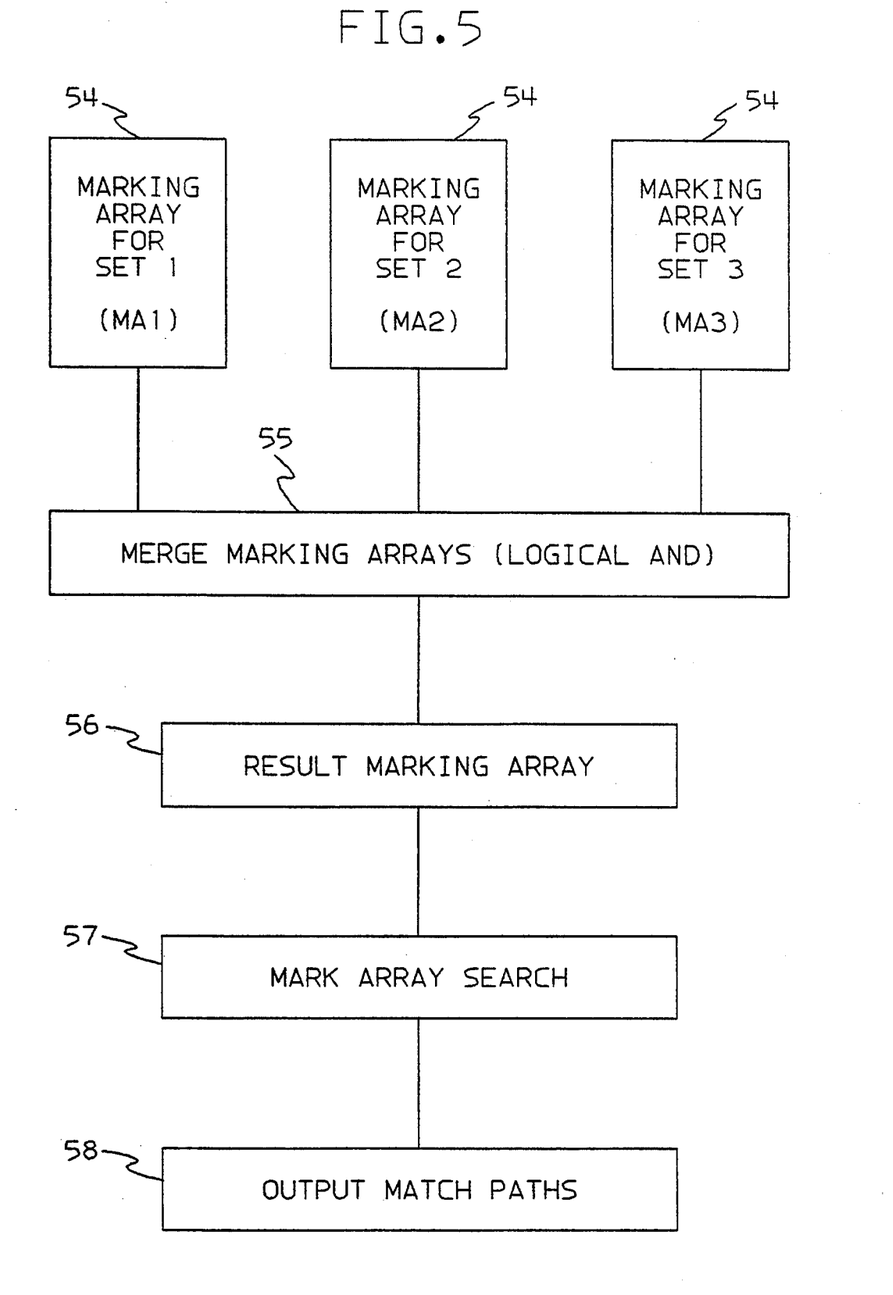
FIG. 5 is a schematic diagram showing the logic for combining two or more mark matrices for a vertical search of more than one field of a database file.

FIG. 5 depicts the relationship just described. Two or more marking arrays 54 are merged at 55 to create a result marking array at 56. The result marking array 56 is searched at 57 in accordance with the problem statement, and provides an output at 58 of the record numbers that satisfy the problem statement.

Figure 6:
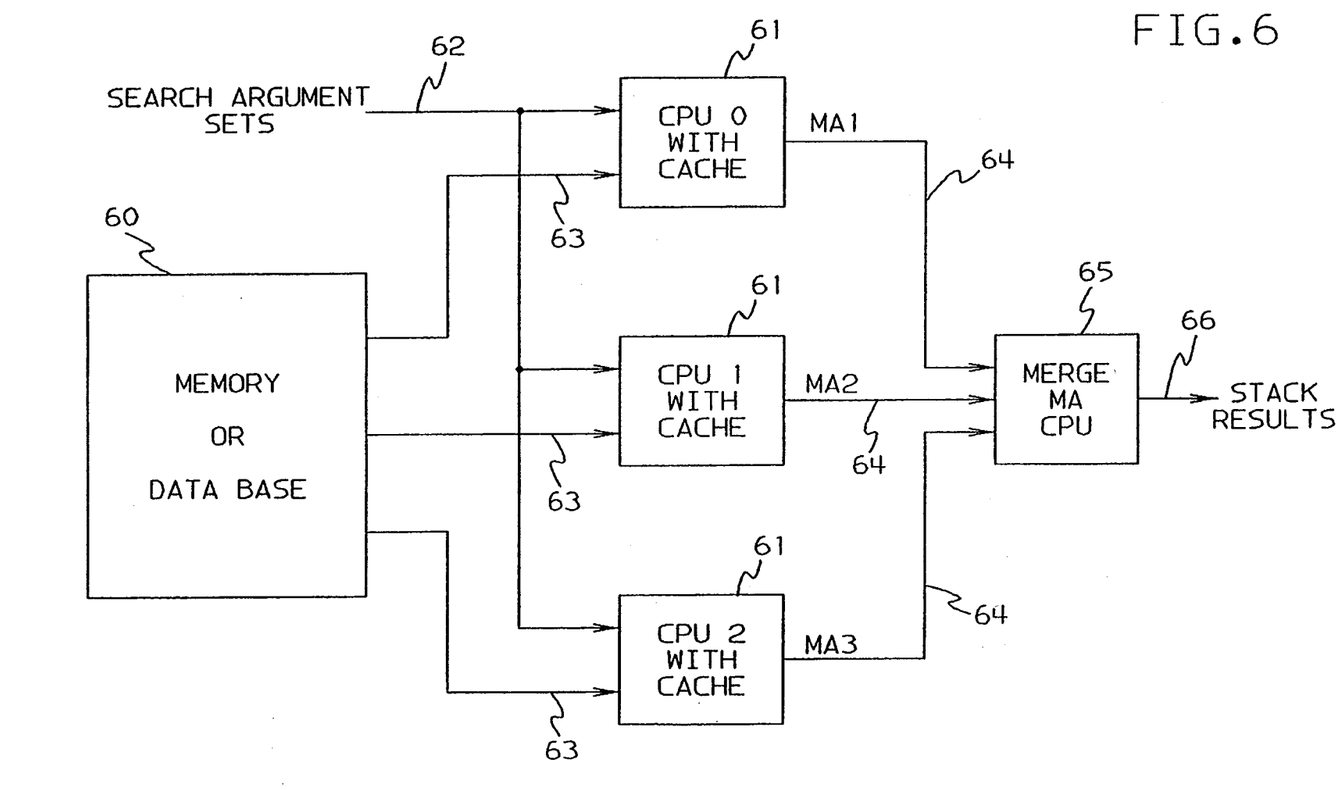
FIG. 6 is a schematic diagram of how multiple mark matrices of the present invention can be implemented using parallel processing techniques.

The creation of a two dimensional marking matrix in accordance with the present invention, and the various methods that can be programmed to search the matrix, suggest suitability for implementing the concept with parallel processing techniques. FIG. 6 is a schematic diagram depicting parallel processing. A memory or database 60 would be connected to, and shared by several central processing units (CPU) 61. Each CPU 61 would include its own storage or cache for storing sets of search arguments received on line 62. The CPU storage or cache would also store the database 60 or at least the data elements from a particular field of all records in the database received on lines 63. Each CPU 61 would create a marking array (MA) which would be output on lines 64 to another CPU 65. CPU 65 would be programmed to combine all of the marking arrays and perform the search of the result marking array in accordance with a problem statement. The output of CPU 65 on line 66 would be the identity of the records of the database that meet the conditions of all of the search arguments and problem statement.

While we have illustrated and described the preferred embodiment of our invention, it is to be understood that we do not limit ourselves to the precise construction herein disclosed, and the right is reserved to all changes and modifications coming with the scope of the invention as defined in the appended claims.

Having thus described our invention, what we claim as new and desire to secure by Letters Patent is:

1. A programmed data processing machine method of searching a file of records, each record including one or more fields, each field including one or more alpha/numeric data elements representing the value of a parameter, the search identifying records where corresponding parameter values as between successive records have a specified value relationship, the method comprising the steps of:
   A. Specifying M search arguments;
   B. Accessing corresponding, specified data elements from each of the N records of a file;
   C. Comparing each of said M search arguments with each of the accessed data elements of said N records;
   D. Creating a two-dimensional N by M matrix of marks, each mark indicating that a corresponding one of the N data elements had a particular value relationship with a corresponding one of the M search arguments, the N dimension being numbered from 1-N corresponding to record numbers 1-N;
   E. Searching said N by M matrix of marks in a pattern controlled by the value relationship indicated by each mark;
   F. Recording the record numbers of the ones of the records where the marks in the N and M direction have a particular spatial relationship.

2. A method in accordance with claim 1 wherein:
The value relationship of Step D includes match or mismatch or don't care.

3. A method in accordance with claim 2 wherein:
The match relationship of Step D includes equal, equal or greater, equal or less, less, or greater.

4. A method in accordance with claim 3 wherein:

The matrix of marks created in Step D includes N rows and from 1 to M columns; and The specified spatial relationship in Step F includes a match indication in column 1 for a row X, followed by a match indication that progresses from row to row and next succeeding columns until a match is found in column M.

5. A method in accordance with claim 4 wherein:

The record numbers recorded in Step F include the record number associated with row X of the matrix of marks, and the record number associated with the row of the matrix of marks where the match was found in column M.

6. A computer implemented method of searching a file of records including a plurality of columns of data comprising the steps of:

A. Specifying a first set of S search arguments and at least a second set of T search arguments wherein S=T;
   B. Accessing a first plurality of columns comprising a data element field common to all of N records of a file and at least a second plurality of columns comprising a data element field common to all of the N records of the file;
   C. Creating a first N by S matrix of marks indicating a value relationship of each of N data elements from the first data field with each of the S search arguments, and creating at least a second N by T matrix of marks indicating a value relationship of each of N data elements from the second data field with each of the T search arguments;
   D. Logically combining the marks from the first and second matrix of marks to form a third N by U matrix of marks where U equals S and T; and
   E. Searching said third N by U matrix of marks in accordance with a pattern controlled by the value relationship indicated by each mark to determine a set of records for which the marks in the N and M direction have a particular spatial relationship.

7. A system for searching a database file of N records, each record consisting of a plurality of binary data elements, the common columns of the system comprising:

data storage means for storing N corresponding data elements from each of the N records;
   argument storage means for storing M search arguments;
   mark storage means for creating and storing a two dimensional marking matrix comprised of N rows and M columns;
   access means connected to said data storage means and said mark storage means for accessing each said data element and corresponding row of said mark storage means;
   M compare means connected to said access means of said data storage means and said argument storage means for comparing each of said data elements with said M search arguments;
   means connecting an output of each of said M compare means to a corresponding one of said M columns of said mark storage means for indicating and storing in a row of said mark storage, a match between a data element associated with the row of said mark storage, and one of said M search arguments associated with one of said columns of said mark storage;
   search means for traversing said mark storage means for detecting a pattern of match indications in said rows and said columns that progress from column 1 of a row of said mark storage to column M of a succeeding row; and
   means for recording the row numbers, and thus the record numbers, of the beginning and ending rows of said mark storage resulting from detecting said pattern of match indications.

* * * * *